US008834268B2

(12) United States Patent
Kern et al.

(10) Patent No.: US 8,834,268 B2
(45) Date of Patent: Sep. 16, 2014

(54) PERIPHERAL DEVICE CONTROL AND USAGE IN A BROADCASTER MODE FOR GAMING ENVIRONMENTS

(75) Inventors: Mark Kern, Aliso Viejo, CA (US); Scott Rudi, Aliso Viejo, CA (US)

(73) Assignee: Red 5 Studios, Inc., Laguna Hills, CA (US)

( * ) Notice: Subject to any disclaimer, the term of this patent is extended or adjusted under 35 U.S.C. 154(b) by 0 days.

(21) Appl. No.: 13/549,350

(22) Filed: Jul. 13, 2012

(65) Prior Publication Data

US 2014/0018165 A1    Jan. 16, 2014

(51) Int. Cl.
A63F 9/00    (2006.01)

(52) U.S. Cl.
USPC .......................................................... 463/31

(58) Field of Classification Search
None
See application file for complete search history.

(56) References Cited

U.S. PATENT DOCUMENTS

| 5,371,852 | A | 12/1994 | Attanasio et al. | |
|---|---|---|---|---|
| 5,384,910 | A * | 1/1995 | Torres | 715/810 |
| 5,943,052 | A | 8/1999 | Allen et al. | |
| 6,067,545 | A | 5/2000 | Wolff | |
| 6,330,605 | B1 | 12/2001 | Christensen et al. | |
| 6,374,336 | B1 | 4/2002 | Peters et al. | |
| 6,380,933 | B1 | 4/2002 | Sharir et al. | |
| 6,434,398 | B1 | 8/2002 | Inselberg | |
| 6,456,304 | B1 | 9/2002 | Angiulo et al. | |
| 6,466,275 | B1 * | 10/2002 | Honey et al. | 348/722 |
| 6,526,448 | B1 | 2/2003 | Blewett | |
| 6,561,811 | B2 | 5/2003 | Rapoza et al. | |
| 6,571,216 | B1 | 5/2003 | Garg et al. | |
| 6,597,375 | B1 * | 7/2003 | Yawitz | 715/723 |
| 6,629,129 | B1 * | 9/2003 | Bookspan et al. | 709/204 |
| 6,699,127 | B1 * | 3/2004 | Lobb et al. | 463/43 |
| 6,760,042 | B2 * | 7/2004 | Zetts | 715/716 |
| 6,760,595 | B2 | 7/2004 | Inselberg | |

(Continued)

FOREIGN PATENT DOCUMENTS

| DE | 102005034692 | 2/2007 |
|---|---|---|
| EP | 1879381 | 1/2008 |

(Continued)

OTHER PUBLICATIONS

Murph, Darren. "Editorial: ESPN bypasses corporate red tape with iPad and Xbox 360, wannabe innovators should take note" Jun. 12, 2010. <http://www.engadget.com/2010/06/12/editorial-espn-bypasses-corporate-red-tape-with-ipad-and-xbox-3/>.*

(Continued)

Primary Examiner — Seng H Lim
(74) Attorney, Agent, or Firm — Carr & Ferrell LLP (57) ABSTRACT

A method for operating a broadcaster mode within a gaming environment of a video game is provided. The method includes receiving, via a networked gaming system, a request from a broadcaster for a video signal for a peripheral display, the broadcaster being a non-participant in the video game occurring within the gaming environment. The method also includes providing the video signal for the peripheral display. A system that facilitates broadcasting a gaming environment is provided and includes a broadcaster module and an interactivity module that provides the broadcaster with one or more options for displaying information. The broadcaster module also includes a display controller include a primary display controller and a secondary display controller. A primary view of the gaming environment displayed on a primary display of the broadcaster being broadcast to at least one spectator. A non-transitory computer readable storage medium having embodied thereon a program is provided.

18 Claims, 5 Drawing Sheets

(56) References Cited

U.S. PATENT DOCUMENTS

| | | | |
|---|---|---|---|
| 6,772,195 B1 | 8/2004 | Hatlelid et al. | |
| 6,864,886 B1* | 3/2005 | Cavallaro et al. | 345/420 |
| 6,928,485 B1 | 8/2005 | Krishnamurthy et al. | |
| 6,996,413 B2 | 2/2006 | Inselberg | |
| 6,999,083 B2 | 2/2006 | Wong et al. | |
| 7,075,556 B1* | 7/2006 | Meier et al. | 345/629 |
| 7,133,051 B2 | 11/2006 | Sloo et al. | |
| 7,219,160 B1 | 5/2007 | Buchsbaum et al. | |
| 7,350,158 B2 | 3/2008 | Yamaguchi et al. | |
| 7,390,254 B2* | 6/2008 | Hirai | 463/4 |
| 7,458,894 B2* | 12/2008 | Danieli et al. | 463/42 |
| 7,490,314 B2 | 2/2009 | Yuknewicz et al. | |
| 7,492,363 B2* | 2/2009 | Meier et al. | 345/419 |
| 7,506,318 B1 | 3/2009 | Lindo et al. | |
| 7,509,390 B1 | 3/2009 | Raman et al. | |
| 7,632,186 B2* | 12/2009 | Spanton et al. | 463/40 |
| 7,719,971 B1 | 5/2010 | Issa | |
| 7,729,992 B2 | 6/2010 | Rose | |
| 7,824,268 B2* | 11/2010 | Harvey et al. | 463/42 |
| 7,827,560 B2 | 11/2010 | Bayer | |
| 7,844,301 B2 | 11/2010 | Lee et al. | |
| 7,890,701 B2 | 2/2011 | Lowery et al. | |
| 7,917,632 B2 | 3/2011 | Lee et al. | |
| 7,970,820 B1 | 6/2011 | Sivasubramanian et al. | |
| 8,001,063 B2 | 8/2011 | Tesauro et al. | |
| 8,025,569 B2 | 9/2011 | Nguyen et al. | |
| 8,025,572 B2* | 9/2011 | Spanton et al. | 463/42 |
| 8,128,469 B2 | 3/2012 | Hormigo Cebolla et al. | |
| 8,128,503 B1* | 3/2012 | Haot et al. | 463/42 |
| 8,130,747 B2 | 3/2012 | Li et al. | |
| 8,235,817 B2 | 8/2012 | Zalewski | |
| 8,628,424 B1 | 1/2014 | Kern et al. | |
| 2001/0036356 A1* | 11/2001 | Weaver et al. | 386/52 |
| 2001/0055991 A1 | 12/2001 | Hightower | |
| 2002/0002074 A1 | 1/2002 | White et al. | |
| 2002/0032056 A1 | 3/2002 | Oh | |
| 2002/0097984 A1* | 7/2002 | Abecassis | 386/70 |
| 2002/0183115 A1 | 12/2002 | Takahashi et al. | |
| 2002/0198769 A1 | 12/2002 | Ratcliff, III | |
| 2003/0038805 A1* | 2/2003 | Wong et al. | 345/473 |
| 2003/0084462 A1* | 5/2003 | Kubota et al. | 725/153 |
| 2003/0220143 A1 | 11/2003 | Shteyn et al. | |
| 2004/0087363 A1* | 5/2004 | Bogenn | 463/29 |
| 2004/0116183 A1* | 6/2004 | Prindle | 463/42 |
| 2004/0153569 A1 | 8/2004 | Savathphoune | |
| 2004/0192354 A1 | 9/2004 | Sawano | |
| 2004/0248631 A1* | 12/2004 | Hirai | 463/4 |
| 2004/0259627 A1* | 12/2004 | Walker et al. | 463/20 |
| 2005/0020359 A1 | 1/2005 | Ackley et al. | |
| 2005/0071736 A1 | 3/2005 | Schneider et al. | |
| 2005/0091597 A1 | 4/2005 | Ackley | |
| 2005/0227771 A1 | 10/2005 | Nelson et al. | |
| 2006/0058103 A1* | 3/2006 | Danieli et al. | 463/42 |
| 2006/0098013 A1* | 5/2006 | Wong et al. | 345/473 |
| 2006/0170778 A1* | 8/2006 | Ely et al. | 348/207.99 |
| 2006/0179147 A1 | 8/2006 | Tran et al. | |
| 2006/0206565 A1 | 9/2006 | Ganesan et al. | |
| 2006/0258446 A1 | 11/2006 | Nguyen et al. | |
| 2007/0055694 A1 | 3/2007 | Ruge et al. | |
| 2007/0063995 A1 | 3/2007 | Bailey et al. | |
| 2007/0117617 A1* | 5/2007 | Spanton et al. | 463/29 |
| 2007/0117635 A1* | 5/2007 | Spanton et al. | 463/43 |
| 2007/0250901 A1* | 10/2007 | McIntire et al. | 725/146 |
| 2007/0256030 A1* | 11/2007 | Bedingfield, Sr. | 715/853 |
| 2007/0298878 A1 | 12/2007 | Short | |
| 2008/0026839 A1 | 1/2008 | Alringer | |
| 2008/0052384 A1 | 2/2008 | Marl et al. | |
| 2008/0071907 A1 | 3/2008 | Thompson | |
| 2008/0119286 A1* | 5/2008 | Brunstetter et al. | 463/43 |
| 2008/0125226 A1 | 5/2008 | Emmerson | |
| 2008/0126357 A1 | 5/2008 | Casanova et al. | |
| 2008/0146339 A1 | 6/2008 | Olsen et al. | |
| 2008/0146342 A1* | 6/2008 | Harvey et al. | 463/42 |
| 2008/0196098 A1 | 8/2008 | Cottrell et al. | |
| 2009/0005196 A1 | 1/2009 | Kessler et al. | |
| 2009/0017750 A1 | 1/2009 | Marcinkiewicz | |
| 2009/0031227 A1 | 1/2009 | Chakrabarti et al. | |
| 2009/0044113 A1 | 2/2009 | Jones et al. | |
| 2009/0083665 A1 | 3/2009 | Anttila et al. | |
| 2009/0100366 A1 | 4/2009 | Fitzmaurice et al. | |
| 2009/0118017 A1* | 5/2009 | Perlman et al. | 463/42 |
| 2009/0118018 A1* | 5/2009 | Perlman et al. | 463/42 |
| 2009/0118019 A1* | 5/2009 | Perlman et al. | 463/42 |
| 2009/0118020 A1* | 5/2009 | Koivisto et al. | 463/42 |
| 2009/0124387 A1* | 5/2009 | Perlman et al. | 463/42 |
| 2009/0144380 A1 | 6/2009 | Kallman et al. | |
| 2009/0172171 A1 | 7/2009 | Amir | |
| 2009/0208181 A1* | 8/2009 | Cottrell | 386/52 |
| 2009/0215531 A1* | 8/2009 | Perlman et al. | 463/31 |
| 2009/0215540 A1* | 8/2009 | Perlman et al. | 463/42 |
| 2009/0249189 A1 | 10/2009 | Jania et al. | |
| 2009/0254998 A1 | 10/2009 | Wilson | |
| 2009/0265473 A1 | 10/2009 | Hydrie et al. | |
| 2009/0290753 A1* | 11/2009 | Liu et al. | 382/100 |
| 2009/0297118 A1* | 12/2009 | Fink et al. | 386/52 |
| 2009/0326970 A1 | 12/2009 | Estrada et al. | |
| 2010/0014825 A1* | 1/2010 | Curtis et al. | 386/46 |
| 2010/0031333 A1 | 2/2010 | Mitchell et al. | |
| 2010/0041475 A1 | 2/2010 | Zalewski et al. | |
| 2010/0064008 A1 | 3/2010 | Yan et al. | |
| 2010/0100849 A1 | 4/2010 | Fram | |
| 2010/0150120 A1 | 6/2010 | Schlicht et al. | |
| 2010/0154050 A1 | 6/2010 | Mukkara et al. | |
| 2010/0167809 A1* | 7/2010 | Perlman et al. | 463/24 |
| 2010/0167816 A1* | 7/2010 | Perlman et al. | 463/30 |
| 2010/0169964 A1 | 7/2010 | Liu et al. | |
| 2010/0174782 A1 | 7/2010 | Rose | |
| 2010/0218104 A1 | 8/2010 | Lewis | |
| 2010/0281095 A1 | 11/2010 | Wehner et al. | |
| 2010/0281432 A1 | 11/2010 | Geisner et al. | |
| 2011/0013087 A1* | 1/2011 | House et al. | 348/564 |
| 2011/0028194 A1 | 2/2011 | Tang et al. | |
| 2011/0029932 A1 | 2/2011 | McKaskle et al. | |
| 2011/0055222 A1 | 3/2011 | Choudur et al. | |
| 2011/0059818 A1 | 3/2011 | Blais et al. | |
| 2011/0093600 A1 | 4/2011 | Lee et al. | |
| 2011/0105226 A1* | 5/2011 | Perlman | 463/30 |
| 2011/0111854 A1* | 5/2011 | Roberts et al. | 463/39 |
| 2011/0145880 A1 | 6/2011 | Wang | |
| 2011/0151971 A1* | 6/2011 | Altshuler et al. | 463/30 |
| 2011/0161666 A1 | 6/2011 | Gladwin et al. | |
| 2011/0202562 A1 | 8/2011 | Bloch et al. | |
| 2011/0238618 A1* | 9/2011 | Valdiserri et al. | 707/608 |
| 2011/0263333 A1 | 10/2011 | Dokei et al. | |
| 2011/0270924 A1 | 11/2011 | Johnsson et al. | |
| 2011/0275431 A1 | 11/2011 | Hirzel et al. | |
| 2011/0295666 A1 | 12/2011 | Musial et al. | |
| 2012/0054002 A1 | 3/2012 | Rotbard et al. | |
| 2012/0054685 A1 | 3/2012 | Su et al. | |
| 2012/0130863 A1 | 5/2012 | Tedjamulia et al. | |
| 2012/0142433 A1* | 6/2012 | Perlman et al. | 463/42 |
| 2012/0149476 A1* | 6/2012 | Perlman et al. | 463/42 |
| 2012/0151346 A1 | 6/2012 | McClements, IV | 715/716 |
| 2012/0151347 A1 | 6/2012 | McClements, IV | 715/716 |
| 2012/0204107 A1 | 8/2012 | Salinas | 715/716 |
| 2012/0311624 A1* | 12/2012 | Oskolkov et al. | 725/25 |
| 2013/0084270 A1 | 4/2013 | Geisner et al. | |
| 2014/0004951 A1 | 1/2014 | Kern et al. | |
| 2014/0018157 A1 | 1/2014 | Kern et al. | |
| 2014/0024463 A1 | 1/2014 | Rudi et al. | |
| 2014/0025987 A1 | 1/2014 | Kern et al. | |
| 2014/0031121 A1 | 1/2014 | Kern et al. | |
| 2014/0038710 A1 | 2/2014 | Rudi et al. | |

FOREIGN PATENT DOCUMENTS

| | | |
|---|---|---|
| JP | 2004362149 | 12/2004 |
| WO | WO9712342 | 4/1997 |
| WO | WO2006076075 | 7/2006 |

OTHER PUBLICATIONS

Point-HD Telestrator with IPad. <http://www.hdtelestrators.com/Ipad%20Telestrator.html>.*

(56) References Cited

OTHER PUBLICATIONS

Abd El-Sattar. A Novel Interactive Computer-Based Game Framework: From Design to Implementation. 2008 International Conference Visualisation [Online] 2008, pp. 123-128.
Blevins. Neverwinter Nights—PC Review at IGN—p. 2. http://pc.ign.com/articles/363/363038p2.html (accessed Aug. 12, 2011).
Haynes. Dead Space Review—Xbox 360 Review at IGN—pp. 2 & 3. http://xbox360.ign.com/articles/918/918892p2.html & http://xbox360.ign.com/articles/918/918892p3.html (accessed Aug. 12, 2011).
Hernandez et al. WeSketch: A 3D Real Time Collaborative Virtual Environment that Improves the GUI Sketching Task. 2011 Eighth International Conference on Information Technology: New Generations [Online] 2011.
Raskin. Graph Plus. PC Magazine [Online] Oct. 17, 1989. V8, N17, p. 102(3).
Rowe et al. A Framework for Narrative Adaptation in Interactive Story-Based Learning Environments. Proceedings of the Intelligent Narrative Technologies III Workshop [Online] 2010.
Ludwig et al., "XEP-0166: Jingle," XMPP Standards Foundation. pp. 1-53. Dec. 23, 2009.
Rosenberg, "Interactive Connectivity Establishment (ICE): A Protocol for Network Address Translator (NAT) Traversal for Offer/Answer Protocols," Internet Engineering Task Force (IETF). pp. 1-117, Apr. 2010.
Zhou et al., "A Method of View-Frustum Culling with OBB Based on Octree," IET Conference on Wireless, Mobile and Sensor Networks 2007, pp. 680-682, Jan. 1, 2007. XP55023509.
World of Warcraft Gold, Anything About WOW, Apr. 23, 2007. retrieved from the internet: http://wowgolds.wordpress.com/2007/04/23/how-to-take-and-make-screenshots/ (accessed on Mar. 30, 2012) XP002672710.
Extended European Search Report with mail date of Mar. 30, 2012, re European Application No. 12151200.8 filed Jan. 16, 2012.
"Algemagorgic Non-Modal Context Menu," CodeGuru, May 22, 2004. retrieved from the internet: http://forums.codeguru.com/showthread.php?t=295801 (accessed on Apr. 27, 2012) XP002675225.
"Context Menu," Wikipedi, the free encyclopedia, Jun. 16, 2010. retrieved from the internet: http://en.wikipedia.org/w/index.php?title=Context_menu&oldid=368337587 (accessed on May 3, 2012) XP002675226.
"Maptool Concepts: The Next UI, Look, and Feel," RPTools.net, Feb. 2010. retrieved from the internet: http://forums.rptools.net/viewtopic.php?f=7&t=13178&sid=107ad2f90d833d6b5669fbeO3587b091&start=45 (accessed May 3, 2012) XP002675227.
"Pie Menu," Wikipedia, the free encyclopedia, Jul. 5, 2010. retrieved from the internet: http://en.wikipedia.org/w/index.php?title=Pie_menu&oldid=371797903 (accessed May 3, 2012) XP002675228.
"Modal Window," Wikipedia, the free encyclopedia, Aug. 18, 2010. retrieved from the internet: http://en.wikipedia.org/w/index.php?title=Modal_window&oldid=379626221 (accessed on May 3, 2012) XP002675229.
Extended European Search Report with mail date of May 4, 2012, re European Application No. 11006996.0 filed Aug. 26, 2011.
"CPUsage wants to harness idle computer power for others to use" written by O.K. Row, available on or before Jul. 2012 and retrieved from URL <http://www.oregonlive.com/small-business/index.ssf/2012/07/cpusage_wants_to_harness_idle.html>, 3 pages.
"CPUsage: Let Your PC Earn Money for You" written by Lambert Varias, available on or before Aug. 26, 2011 and retrieved from URL <http://technabob.com/blog/2011/08/26/cpusage-make-money-with-your-pc/>, 3 pages.
"Need cash? Forget plasma, and donate CPU time instead" written by Stacey Higginbotham, available on or before Jul. 11, 2011 and retrieved from URL <http://gigaom.com/cloud/need-cash-forget-plasma-and-donate-cpu-time-instead/>.
"Info on Points and Redemption" written by Jeff Martens, available on or before Jul. 20, 2011 and retrieved from URL<http://www.cpusage.com/blog/computer-owners/info-on-points-and-redemption/>, 1 page.
"Apr./May 2011 Admin Requirement Application—Europe." 13d.net. Online. Apr. 24, 2011. Accessed via the Internet. Accessed Nov. 8, 2012. <URL: http://forum.i3d.net/battlefield-heroes-ranked-community-servers/170034-apr-may-2011-admin-requirement-application-europe.html#post1270013>.
BlamDarot, "Achievement Screenshotter", World of Warcraft Mod, Created Jul. 3, 2009, Last Updated Nov. 4, 2010, description accessed at http://wow.curseforge.com/addons/achievement-screenshotter on Feb. 15, 2013.
Rytych, "Game-like environments for nuclear engineering education using GECK", 1st International Nuclear & Renewable Energy Conference (INREC), pp. 1-5, IEEE, Mar. 2010.
Extended European Search Report with mail date of Dec. 3, 2012, re European Application No. 12170191.6 filed May 31, 2012.
Zhang, J. et al "WindTalker: A P2P-Based Low-Latency Anonymouns Communication Network," IEICE Transactions on Communications, Communications Society, Tokyo, JP, vol. E92B, No. 10, Oct. 1, 2009, pp. 3183-3194.
Extended European Search Report with mail date of Jan. 8, 2013, re European Application No. 12170200.5 filed May 31, 2012.
International Search Report mailed Feb. 21, 2013 in application No. PCT/US2012/20007, filed Jan. 12, 2012.
"Neverwinter Nights Platinum". Game Manual. Copyright 2004, Atari Interactive, Inc. 114 pages.
"Horse menu". Neverwinter Nights Wiki page. Retrieved Jun. 20, 2013 from URL <Http://nwnwikia.com/wiki/Horse_menu>. 2 pages.
"Counter Strike Manual" published on or before May 15, 2006, and retrieved Jun. 13, 2013 from URL <http://web.archive.org/web/20060515161034/http://voidclan.tripod.com/csmanual.htm>, 17 pages.
"Spectator FAQ" published on or before Nov. 11, 2011 and retrieved from URL <http://web.archive.org/web/20111110125011/http://na.leagueoflegends.com/spectator-faq>, 4 pages.
"Killcam Description for Call of Duty" published on or before Nov. 11, 2011 and retrieved from URL <http://web.archive.org/web20111126172904/http:/callofduty.wikia.com/wiki/Kilcam>, 7 pages.
"Counter-Strike" game description published on or before Nov. 21, 2010 and retrieved from URL <http://web.archive.org/web/20101121144545/http://en.wikipedia.org/wiki/Counter-Strike>, 6 pages.
"Official Rules of Baseball—2011 Edition". Major League Baseball. Feb. 16, 2011. Retrieved from the internet. Retrieved Jun. 1, 2013. <URL:http://web.archive.org/web/20120112040330/http://mlb.mlb.com/mlb/official_info/official_rules/foreword.jsp>.
European Patent Office First Exam Report mailed Mar. 4, 2013 in application No. 11006996.0, filed Aug. 26, 2011.
Bloviator, "America's Army Training Guide", www.gamefaqs.com, Online, Mar. 24, 2008, Accessed via the Internet Sep. 13, 2013, <URL: http://www.gamefaqs.com/pc/561551-americas-army/faqs/45333>.
Baset et al. "Reliability and Relay Selection in Peer to Peer Communication System", Dept. of Comp. Sci. Columbia University, NY, USA, 2010.
Intention to Grant dated Feb. 14, 2014 in European Patent Application No. 12170200.5, filed May 31, 2012.

\* cited by examiner

PERIPHERAL DEVICE CONTROL AND USAGE IN A BROADCASTER MODE FOR GAMING ENVIRONMENTS

FIELD OF THE INVENTION

The present technology relates generally to videogames and gaming environments, and more specifically, but not by way of limitation, to videogames and gaming environments that allow for a peripheral device for use within a broadcaster mode within the gaming environment. In some instances, the peripheral device may control a display of the gaming experience between active participants, and/or may show alternative views of the gaming experience.

BACKGROUND

Spectator modes within video games often allow for non-participating parties (e.g., spectators) to view game play or activities of active gaming participants (e.g., individuals playing the videogame). Video games may be viewed by spectators and commentary may be added by broadcasters to the visual component for enhancement of the viewing experience.

SUMMARY OF THE INVENTION

According to some embodiments, the present technology may be directed to a method for operating a broadcaster mode within a gaming environment of a video game. The method includes receiving, via a networked gaming system, a request from a broadcaster for a video signal for a peripheral display, the broadcaster being a non-participant in the video game occurring within the gaming environment. The method also includes providing the video signal for the peripheral display.

According to some embodiments, the present technology may be directed to a system that facilitates broadcasting a gaming environment. The system includes at least one server that is selectively coupleable to an end user computing system. The at least one server includes a processor configured to execute instructions that includes a video game program that provides the gaming environment. The video game program includes a broadcaster module that provides a broadcaster access to view the gaming environment, and an interactivity module that provides the broadcaster with one or more options for displaying information about the gaming environment and receives a selection of the one or more options from the broadcaster. The broadcaster module also includes a display controller include a primary display controller and a secondary display controller. A primary view of the gaming environment displayed on a primary display of the broadcaster being broadcast to at least one spectator.

According to some embodiments, the present technology may be directed to a non-transitory computer readable storage medium having embodied thereon a program. The program is executable by a processor to perform a method providing a peripheral device control to a broadcaster mode within a gaming environment. The method includes receiving, via a networked gaming system, a request from a broadcaster for a video signal for a peripheral display. The broadcaster is a non-participant in a video game occurring within the gaming environment. The method also includes providing the video signal for the peripheral display.

DETAILED DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The present technology provides for a peripheral device to interact with a broadcaster mode or application of a video game. The present technology provides control of a broadcaster mode of a video game using a tablet computer, smartphone or other peripheral device. The broadcaster mode also allows for additional control surfaces, for instance touchscreens, for interacting with the game to ease the burden of controlling the complex controls that a broadcaster requires to televise, record or webstream a video game, which may be prerecorded or in-progress.

A broadcaster may assign a secondary monitor, or set of monitors to display different camera angles that the broadcaster has pre-assigned, or all camera angles are available for a map type, for instance a game environment or game play area. These additional monitors display alternate views of the game, without distracting from the main monitor which represents what the viewer will be seeing (also referred to as the main view or master view). The master view is broadcast by the broadcaster to spectators, and the peripheral monitors assist the broadcaster in developing a high quality production of the master view.

In addition, additional monitors may display broadcast controls in a graphical user interface (GUI) that allow the broadcaster to manipulate the GUI for broadcast control without interfering with the master view. Such controls and additional camera views may be on monitors connected directly to a personal computer (PC), or may be connected wirelessly over WiFi or Bluetooth connection to mobile tablets and phones. In this manner, broadcasters, also referred to as shoutcasters, may be provided with a way to wirelessly connect with, view, and control the broadcaster application.

The GUI controls of a peripheral device of a broadcaster mode may be fully customizable. For instance, broadcasters may be able to open a menu of controls and drag and drop appropriate controls, or assign quick key buttons to secondary monitors or to mobile devices paired to the computer being used. Additionally, peripheral displays may enable a broadcaster to prepare a camera angle, rewind, slow motion, or drawing overlay over a still or moving video image for later display on the master view. The present technology enables a broadcaster to customize a peripheral display in a spectator mode while keeping the master view uncluttered. The present technology also enables a broadcaster to work remotely from a paired iPad, tablet computer, smartphone or other mobile device, thereby enabling the use of a touchscreen interface.

The broadcaster mode provides special features for broadcasters. These broadcasters or shoutcasters may be sports announcers for video games or other e-sports. The broadcaster mode may call-up profiles, track objects, and/or call-up game and/or player statistics, etc. The suite of tools in the broadcaster mode may be used by shoutcasters, and not available to general players.

Individuals can stream gameplay, and talk over the gameplay, using a spectator mode. The present technology provides broadcast grade tools, including head-to-head statistics, highlighting, drawing, and or other broadcast grade tools that would be known to one of ordinary skill in the art with the present disclosure before them. A broadcaster mode may be controlled on a device, such as an iPad, a specialized gaming laptop, or desktop and LCD screen. A secondary screen or multiple screens that show different aspects of a game may also likewise be utilized. A broadcast mode may enable high quality production values in e-sports broadcasting and commentary, and may facilitate the licensing of e-sports broadcasts on television.

According to some embodiments, the present technology may provide broadcaster features within videogames, and specifically the gaming environment of the videogame. Exemplary end user computing systems include, but are not limited to, personal computers, mobile devices, video game consoles, and so forth. Furthermore, broadcaster requests may be received from input devices associated with the end user computing systems, such as a keyboard, a microphone, a Bluetooth headset, a mouse, a motion-based input device, a webcam, and so forth.

Generally speaking, the term "broadcaster" may be understood to include a non-participating actor that is allowed to view and/or image the gaming environment, and in some instances, for the purpose of broadcasting a "play-by-play" commentary on the action of videogame. Broadcasters can view the on-going gameplay in a gaming environment via a broadcaster mode, and may add additional material or manipulate the view of the video game to enhance the analysis provided by the broadcaster. In contrast, an active participant is an actor that directly interacts with the gaming environment (e.g., a player).

A broadcaster mode is provided for a video game environment. The broadcaster mode provides various features to a broadcaster to facilitate the live or delayed coverage of game play in a video game. Features provided within a broadcaster mode include one-touch database access and one touch instant replay.

The broadcaster mode allows a player to access additional, specialized portions of the video game program that provide a tool or a suite of tools for the amateur, professional, or semi-professional broadcasting of e-Sports games on the web, television, or film, either live or pre-recorded. Unlike broadcast mode in video, the present technology may be utilized in a real-time game simulation, which can be manipulated at will, giving the broadcaster more control over displaying the game, for example, rewinding it, changing camera angles, etc.

While other games feature a spectator mode that can show re-simulated gameplay, none offer the highly specialized professional tools and access to data that enable a broadcaster to optimize the game for live streaming over television or the web, with professional controls and configurable user interfaces for the specific purpose of broadcasting.

Regular players may not be able to access this mode until they are approved as broadcasters by a game administrator. This can be accomplished through several methods. For example, a game moderator may flag a player for broadcast status on the server, which will enable additional client and server functionality. In addition, the player may apply for broadcaster status via the game's internal user interface (UI), or via a separate web site. The process may include presenting the broadcaster with a new license agreement catered to broadcasting, automatically proceeding when the agreement is accepted, and then presenting the broadcaster with a nominal broadcasting fee which must be paid (monthly or annually) to have access to the additional software features for broadcast mode.

The broadcaster mode may enable special features not available to other gamers to professionally manage the presentation of broadcast and game graphics over a live or recorded video stream. These may include custom controls for cameras, player data and game stats, score presentation, replays, and more. In addition, the broadcast mode may enable support for additional hardware to control the application, including secondary monitors, specialized keyboards, displays and mobile devices.

One feature provided in a broadcast mode may be access to a database, and more specifically, a one touch broadcast mode database access. Using this feature, the broadcast mode may allow access for broadcasters to an array of player and game map information not normally available in other modes of the game. Broadcast mode may allow wide access to the game server's database of logs including: 1) current leaderboards and rankings; 2) individual player statistics and information; 3) heat maps (maps graphing data such as where players die, paths they travel, etc.); and 4) other historical performance data for players both individually and in the aggregate.

Game data and special camera views may be previewed on a peripheral device and moved to the main device displaying the master view when the broadcaster deems them ready for broadcasting.

Some exemplary embodiments enable provide broadcasters with access to certain privileged parts of the database. In addition, the exemplary system allows broadcaster to custom configure, select and choose how they want to display the information such that a broadcaster can call up custom UI panels at the touch of a button to display the information.

One of the broadcaster mode features includes "player cards" that can be called up during the broadcast of a game. These cards feature data pertinent to a player's success record, win-loss ratio, kill-death ratio, or other suitable information that would be known to one of ordinary skill in the art. Other game player data gleaned from player logs, for a particular game or for a history of the game player or game avatar, may be accessed by a broadcaster, who can determine which information she wishes to display as the default information on the player card. This information may be bound to the game player card with a single touch control or keystroke. This data selection may be used as a default data selection applicable to other players when accessed by the broadcaster. The other player or players used in a comparison may not be participating in the present game being broadcast, thereby enabling historical comparisons of past players, for example.

A one touch instant replay mode may be provided in the broadcaster mode. A single press of a button may rewind gameplay to show a 30 second (or N second) instant replay of the action to his or her audience. Unlike video, this rewind is of live, recorded game data, where the simulation of the game is rewound by a set amount. While other games offer a rewind mode, none allow for the convenience that a broadcaster would need to set replay of a predetermined duration of time at a single key press.

Such replays may also be custom configured by time duration, or, because the feed is actual gameplay simulation and not video, tied to key events such as "x seconds before last kill" or even specific to individual players "when player x shoots and kills player y."

For example, a broadcaster may desire an instant replay of 30 seconds. The broadcaster may open a control UI in the broadcaster mode and assign a 30 second rewind. Additionally, the broadcaster may bind the rewind command to the "R" key on the keyboard. Now, whenever the "R" key is pressed, the local simulation of the game will rewind to the thirty second mark in the past, without interrupting the regular flow of the game for the rest of the players. At the conclusion of the rewind, the view may automatically resume at the current point in the game, or may scan forward at double or another multiple speed up to the current point, or may offer a choice to the broadcaster to continue viewing at normal speed, jump, or speed forward.

Another example allows the broadcaster to rewind when an important player dies. The broadcaster may set another rewind command to rewind to the exact moment that the last player or a named player dies, and/or further configure it to go back another ten seconds before then to capture the video image of who shot the named player. This rewind command may be bound to the "P" key so as not to interfere with the regular "R" key thirty second rewind. When the player dies, pressing the "P" key commands a rewind of the game to the exact time that player died, and then rewind an additional ten seconds from there. This occurs without interrupting the actual game being held at that moment.

Figure 1:
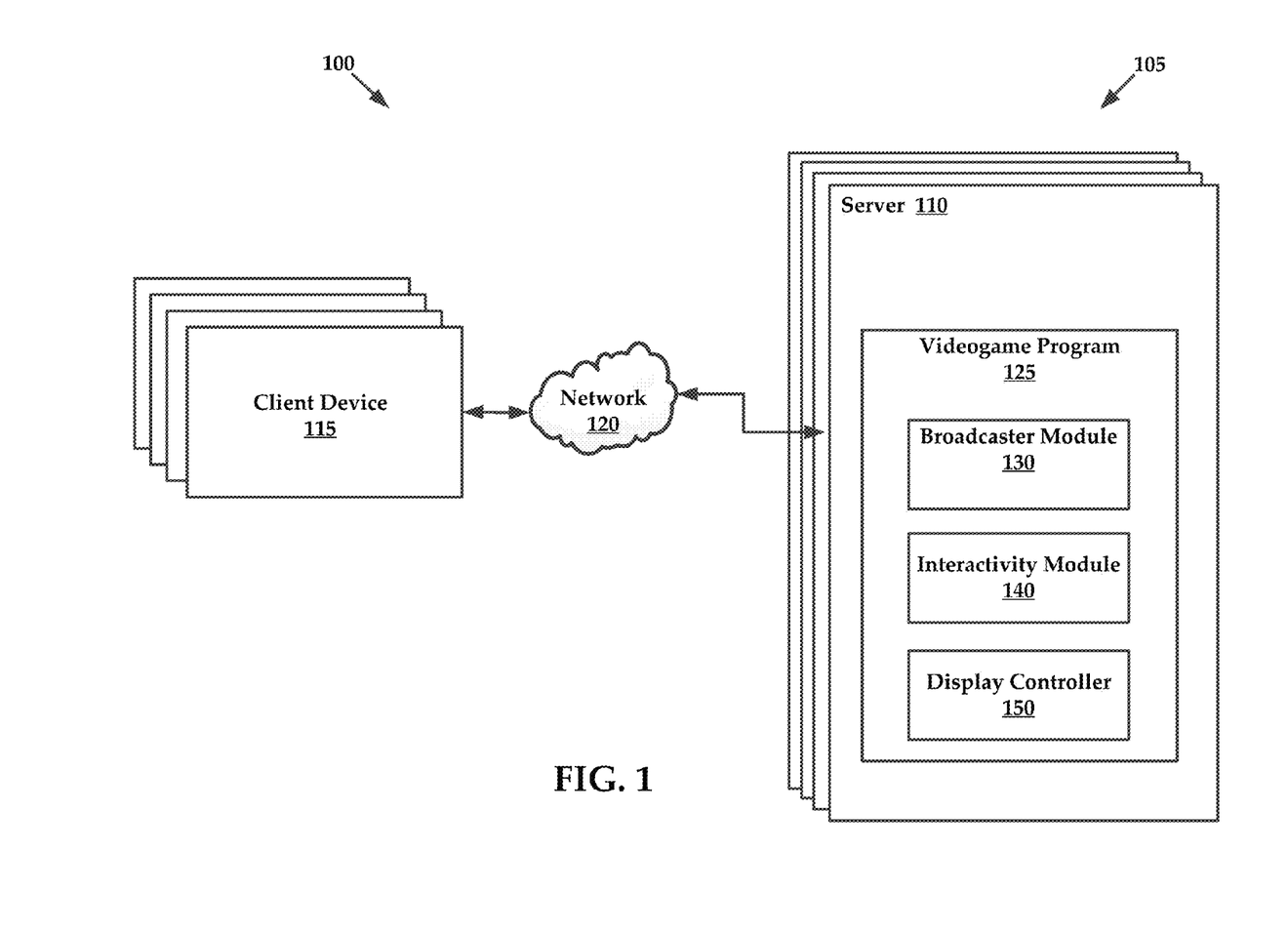
FIG. 1 illustrates an exemplary architecture for practicing aspects of the present technology.

FIG. 1 illustrates an exemplary architecture 100 for practicing aspects of the present technology. The architecture 100 is shown as including a networked gaming system 105 implemented within the context of a server 110 (shown within a plurality of web servers). The networked gaming system 105 may facilitate the operation of a video game program 125 that generates a gaming environment.

An end user computing system 115 (shown within a plurality of end user computing systems) may be communicatively coupled to the server 110 via a network connection 120. It will be understood that the network connection 120 may include any private or public network such as the Internet.

When the end user computing system 115 is communicatively coupled to the server 110, broadcasters may interact with the gaming environment generated by a video game program 125 using the end user computing system 115. Likewise, active participants may interact with the gaming environment using the end user computing system 115.

In some embodiments, the networked gaming system 105 may be implemented as a cloud-based computing environment. In general, a cloud-based computing environment is a resource that combines the computational power of a large grouping of processors and/or that combines the storage capacity of a large grouping of computer memories or storage devices. For example, systems that provide a cloud resource may be utilized exclusively by their owners. These systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

According to some embodiments, the networked gaming system 105 may be generally described as a particular purpose computing environment that includes executable instructions stored in memory. These instructions, when executed by the processor provide interactive broadcaster features within the gaming environment. More specifically, the networked gaming system 105 may execute the video game program 125 to generate a gaming environment (see FIG. 4 for an exemplary view of a gaming environment). The video game program 125 may comprise one or more mechanisms for facilitating broadcaster interaction with the gaming environment.

In accordance with the present technology, the networked gaming system 105 may facilitate a broadcast of a gaming environment by providing a broadcaster with access to a view of the gaming environment and special features to enhance the broadcast of the game to spectators. The special features may include the ability to rewind play, highlight a player or zone of action, display player data, display game data, and/or manipulate a view of game play by zooming and/or changing a camera perspective. The networked gaming system 105 may receive a selection of the one or more features from the broadcaster and effect a change of the view of the gaming environment based upon the selection.

In some embodiments, the executable instructions such as a video game program 125 that facilitates a gaming environment may reside on the server 110. In some instances, the video game program 125 may comprise a broadcaster module 130, an interactivity module 140, and a display controller 150. In other embodiments, the broadcaster module 130, the interactivity module 140, and the display controller 150 may cooperate together as a standalone plug-in or module that is separate from the video game program 125.

It is noteworthy that the server 110 may include additional modules, engines, or components, and still fall within the scope of the present technology. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionalities.

According to some embodiments, the broadcaster module 130 may provide a broadcaster access to view the gaming environment, while the interactivity module 140 provides the broadcaster with one or more features for displaying the gaming environment and receives a selection of the one or more features from the broadcaster.

With regard to the video game program 125, the video game program 125 may comprise any type of video game application/program/set of executable instructions, including but not limited to, a multiplayer networked video game such as a MMORPG (massively multiplayer online role-playing game), a first-person shooter, a strategy game, role playing games, action games, arcade games, simulation games, and so forth. Other suitable types of video games that would be known to one of ordinary skill in the art are also likewise contemplated for use in accordance with the present technology. Active participants (e.g., game players) may interact with the gaming environment that is generated by the video game program 125. With regard to conventional videogames, the gaming experience for active participants is largely, if not entirely, predetermined by game designers and encoded into the videogame. Therefore, other than actions performed within the gaming environment by other active participants, the gaming experience of an active participant is preconfigured into the executable instructions for the videogame.

Advantageously, the present technology allows for broadcaster interaction with the display of the gaming environment. Broadcaster interaction may comprise rewinding, changing camera angles, and changing zoom levels. In other instances, the interaction may be highlighting a player with a glow, encircling a player or group of players with a pre-programmed shape, or may be a manually input line or lines. The broadcaster input may be received from an end user computing system in the form of button click, mouse clicks, cursor movements, keystrokes, accelerometer sensed input, gesture-based input, motion sensing input, facial recognition, or any combinations thereof.

According to some embodiments, the broadcaster module 130 may be executed to allow for broadcaster access to the gaming environment. This feature may be referred to as "broadcaster mode." Broadcasters may gain access to views of the gaming environment and graphical overlays and/or other features from a graphical user interface that is generated by the video game program 125. The broadcaster environment may include a view of at least a portion of the gaming environment and/or a plurality of views of different portions of the gaming environment. In some instances, a broadcaster may be allowed to follow a selected or specified active participant. In other embodiments, the broadcaster may roam through the gaming environment in a free-form mode. Exemplary views of the gaming environment may comprise a first-person perspective view (relative to the broadcaster or an active participant, a top-down perspective view, and so forth. The broadcaster module 130 may provide the broadcaster with a plurality of view features such as zoom, pan, replay, tilt, and so forth.

In some embodiments, the video game program 125 may determine active participants located proximate the broadcaster's viewpoint. Alternatively, if the broadcaster has chosen to follow a particular active participant, the video game program 125 may track this information as well.

According to some embodiments, the interactivity module 140 may provide the broadcaster with one or more features for displaying the gaming environment, and in some embodiments, the display controller 150 may provide the broadcaster with the option for using a peripheral device to view additional angles, as a controller, for instance one using a touch screen user interface, and/or as a staging area for images or video feeds prior to display on a master view.

Figure 2:
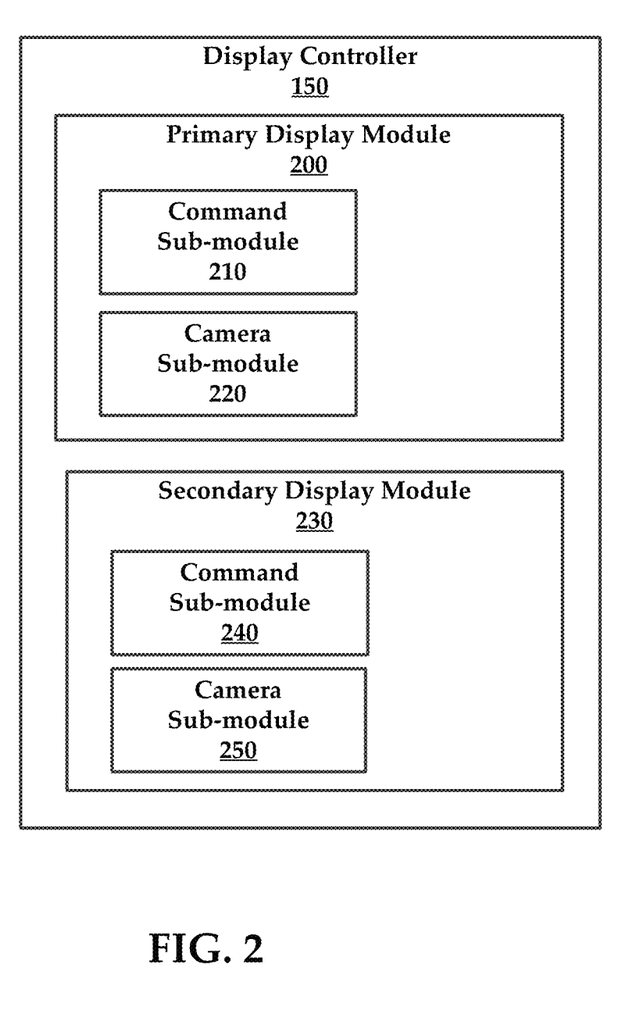
FIG. 2 illustrates an exemplary architecture for practicing further aspects of the present technology.

FIG. 2 illustrates an exemplary architecture of display controller 150 for practicing aspects of the present technology. Display controller 150 is shown as including a primary display module 200 and a secondary display module 230. Alternatively, display controller 150 may include more or fewer modules.

Primary display module 200 is shown as including command sub-module 210 and camera sub-module 220. Alternatively, primary display module 200 may include more or fewer sub-modules. Command sub-module 210 may operate to receive commands from a broadcaster to change the primary display or master view of a broadcaster. Command sub-module 210 may include commands to include or remove game player data and/or game data. Game data may relate to a specific game participant, and may include number of kills, number of deaths, success against particular opponents, and/or any other data specific to a particular game participant. Game data may operate to display game data relating generally to a game, for example team scores, time remaining, game participants and alliances, if any, and/or any other data relative to a particular game.

Command sub-module 210 may include commands to highlight a particular game participant, game participants, and/or zone of activity. Command sub-module 210 may operate to enable a broadcaster to tailor the view of the game environment, for instance by focusing on a particular participant or group of participants, a particular area of interest, and/or a particular conflict.

Command sub-module 210 may include commands to move the master view to a peripheral device or alternatively to move a view on a peripheral device to the primary display. Command sub-module 210 may interface with a keyboard or other input device to control the image on a primary display.

Camera sub-module 220 may include commands to change a perspective, zoom in or out, rewind, slow down, speed up, and/or add an image overlay onto a video game image. Rewind amounts may be preset and or tied to specific game events (for example game participant deaths, contacts, proximity, or hits), and/or bound to specific keys to specific commands for one-touch, via one key activation, access to the specified command. For instance, the "R" key may be an automatic thirty second (or N second) rewind. Likewise, the "P" key may rewind to ten seconds (or N seconds) prior to a specific player's death. Camera perspective may also be adjusted to assist the broadcaster in presenting a commentary on the gameplay.

Secondary display module 230 is shown as including command sub-module 240 and camera sub-module 250. Alternatively, secondary display module 230 may include more or fewer sub-modules. Command sub-module 240 may operate to receive commands from a broadcaster to change the primary display or master view of a broadcaster. Command sub-module 240 may include commands to include or remove game player data and/or game data. Game data may relate to a specific game participant, and may include number of kills, number of deaths, success against particular opponents, and/or any other data specific to a particular game participant. Game data may operate to display game data relating generally to a game, for example team scores, time remaining, game participants and alliances, if any, and/or any other data relative to a particular game.

Command sub-module 240 may include commands to highlight a particular game participant, game participants, and/or zone of activity. Command sub-module 240 may operate to enable a broadcaster to tailor the view of the game environment, for instance by focusing on a particular participant or group of participants, a particular area of interest, and/or a particular conflict.

Command sub-module 240 may include commands to move the peripheral view to a main display or alternatively to move a view on a main display device to a peripheral display. Command sub-module 240 may interface with a keyboard or other input device to control the image on a primary display, and in some instance may include a touch screen device to enable an easy interface.

Camera sub-module 250 may include commands to change a perspective, zoom in or out, rewind, slow down, speed up, and/or add an image overlay onto a video game image. Rewind amounts may be preset and or tied to specific game events (for example game participant deaths, contacts, proximity, or hits), and/or bound to specific keys to specific commands for one-touch, via one key activation, access to the specified command. For instance, the "R" key may be an automatic thirty second (or N second) rewind. Likewise, the "P" key may rewind to ten seconds (or N seconds) prior to a specific player's death. Camera perspective may also be adjusted to assist the broadcaster in presenting a commentary on the gameplay.

Figure 3:
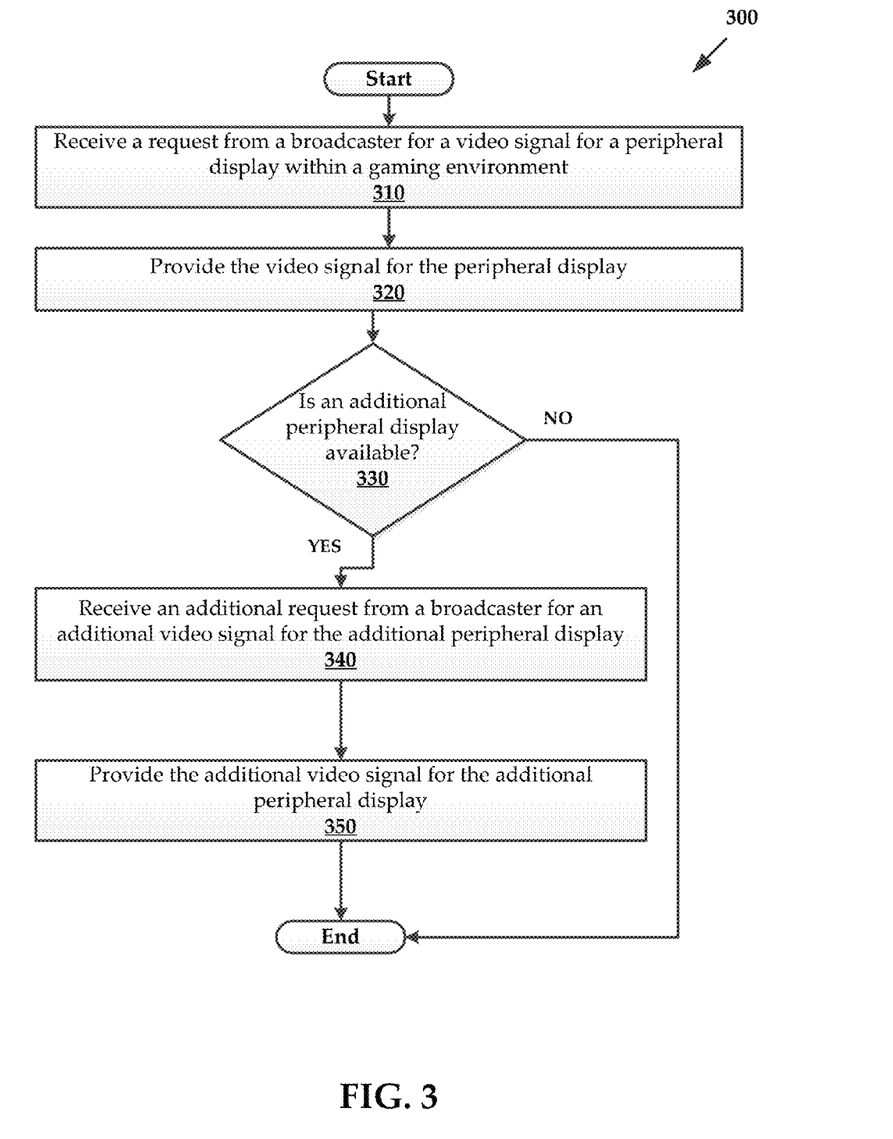
FIG. 3 is a flowchart of exemplary method for facilitating a broadcaster mode within a gaming environment.

FIG. 3 is a flowchart of an exemplary method 300 for operating a broadcaster mode within a gaming environment of a video game. In accordance with the present disclosure, the method 300 may flow from the start oval to step 310, which indicates to receive a request from a broadcaster for a video signal for a peripheral display within a gaming environment. From step 310, the flow proceeds to step 320, which indicates to provide the video signal for the peripheral display. From step 320, the flow proceeds to decision 330, which asks whether an additional peripheral display is available. If the answer to decision 330 is negative, the flow proceeds to the end oval. If the answer to decision 330 is affirmative, the flow proceeds to step 340, which indicates receive an additional request from a broadcaster for an additional video signal for the additional peripheral display. From step 340, the flow proceeds to step 350, which indicates to provide the additional video signal for the additional peripheral display. From step 350, the flow proceeds to the end oval.

Method 300 may be performed iteratively, meaning that it proceeds from the end oval to the start oval. Alternatively, any of the decision operations may be removed, other decision operations may be added, and the order of the decision operations may be changed.

Figure 4:
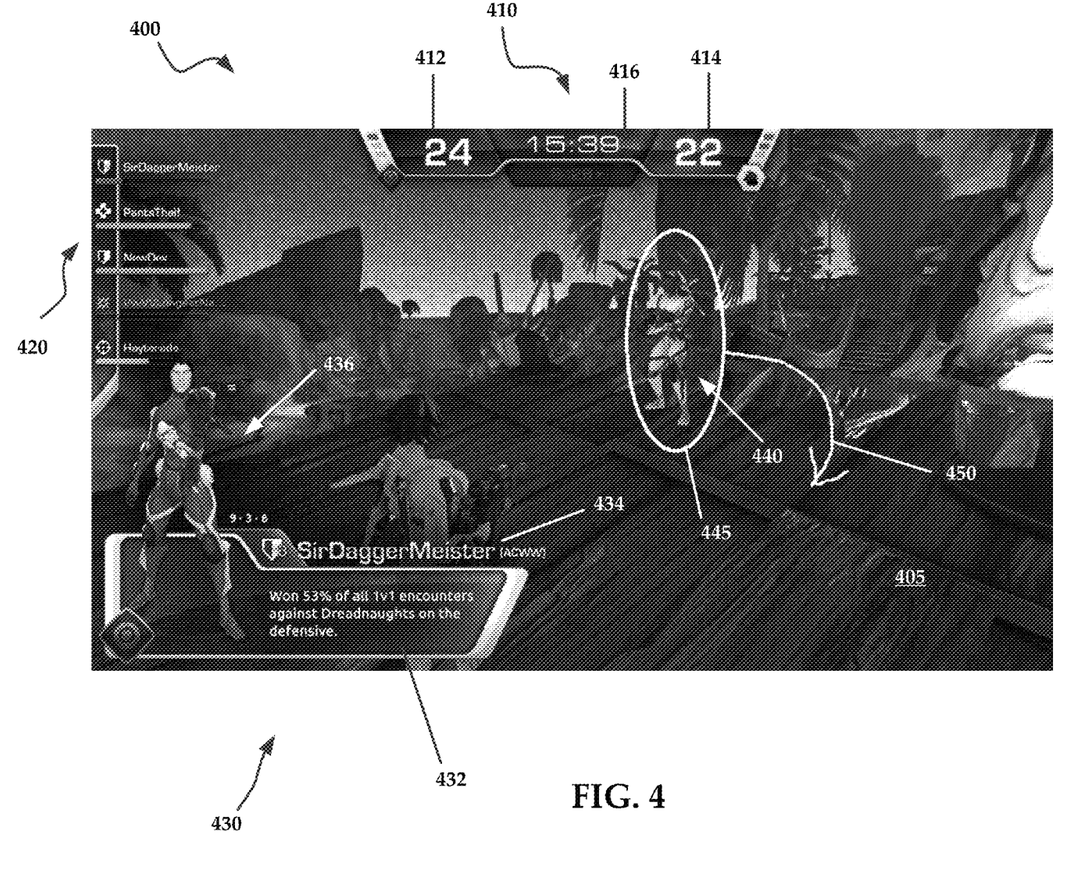
FIG. 4 is an exemplary view of a gaming environment.

FIG. 4 is an exemplary view 400 of a gaming environment 405. Exemplary view 400 may be a master view on a primary display of a broadcaster, and broadcast to spectators, or alternatively view 400 may be on a peripheral device of a broadcaster. View 400 may be displayed on a touchscreen, and a user, for instance a broadcaster, may be able to manipulate the data overlays and/or drawing overlays by interacting with the screen directly via a fingertip or stylus. View 400 may be prepared on a peripheral device using a touchscreen, including preparing drawing overlays and/or adding or deleting data overlays, and may then be transferred to a primary display showing a master view. In this manner, a broadcaster may increase production values of a broadcast by utilizing an offline mode. Additionally or alternatively, view 400 may be used by a broadcaster as a control area for a primary display, or as an additional source of information for the broadcaster.

Gaming environment 405 is shown with active participants, including player 440, within a landscape. It will be understood that this view of the gaming environment that is shown in FIG. 4 is an exemplary view that may be provided to a broadcaster and/or any viewers of the broadcast. View 400 of FIG. 4 approximates the same view that the active participant views in a third-person view mode. View 400 includes several features specific to a broadcast mode.

View 400 includes game data area 410 on the top center edge of view 400. Alternatively game data area 410 may be in any appropriate portion of view 400. Game data area 410 includes blue team score 412, red team score 414, and time remaining 416. Any other appropriate game data may be include in game data area 410, for instance time elapsed. Game participant information 420 is displayed in an area separate from game data area 410, but may alternatively be positioned in the same area. Game data area 410 and game participant information 420 may be customized by a broadcaster to display only the information selected by the broadcaster for display.

View 400 also includes player data area 430 on the lower left side of view 400. Alternatively player data area 430 may be in any appropriate portion of view 400. Player data area 430 includes specific information 432 selected by the broadcaster for display, as well as player name 434 and player avatar 436. Both the game data and the player data shown in view 400 may be automatically pulled from the servers of the video game, and in particular may be culled from a log of all historical activity by a player or a group of players within a game.

A broadcaster utilizing the system provided herein may bring up some or all of the information in game data area 410 or player data area 430 at the press of a button, and may remove the display also at the press of a button. The broadcaster may also highlight player at the press of a button, and view 400 shows player 440 highlighted. Highlighting enables easy identification of a player, particular to associate the commentary of the broadcaster with the topic of their commentary.

A broadcaster may also utilize drawing overlays, for instance oval 445 to indicate the subject of commentary, in this case player 440. Further, a broadcaster may utilize free-hand drawing overlay 450 to indicate a direction or any other spatial idea useful for enriching the commentary on the e-sporting event. For example, in FIG. 4, free-hand drawing overlay 450 illustrates a possible direction of travel for player 440, which may be either advantageous or disadvantageous.

Additionally, as discussed above, a broadcaster may rewind at the touch of a button, and may tie a specific rewind command to a game event, for instance the death of player 440.

In some exemplary embodiments, the peripheral display includes a smartphone and/or a touchscreen tablet computer. In some embodiments, the request includes a request for a user interface, and the user interface includes a touch screen control. The user interface may be configurable by the broadcaster. The user interface may include a rewind command, a command to highlight an avatar of a game participant, a request to display data relating to a game player, and a request to display data relating to the video game. The user interface may include at least a game view and a drawing overlay command. The drawing overlay command may provide a manually input line and/or a preprogrammed line superimposed over the game view.

The request may include a request for a secondary view of the gaming environment. A primary view of the gaming environment may be displayed on a primary display of the broadcaster. The secondary view may include a rewound view of the video game, a slow-motion view of the video game, an alternative perspective of the video game from a primary perspective displayed on the primary display, an alternative zoom quantity of the video game from a primary zoom quantity displayed on the primary display, and a view of the video game including a drawing overlay.

A primary view of the gaming environment displayed on a primary display of the broadcaster may be broadcast to at least one spectator.

The method may include receiving, via the networked gaming system, an additional request from a broadcaster for an additional video signal for an additional peripheral display. The method may also include providing the additional video signal for the additional peripheral display.

In an exemplary system, the secondary display controller provides a configurable user interface to the broadcaster, the configurable user interface comprising a touch screen interface.

The user interface may include a rewind command, a command to highlight an avatar of a game participant, a request to display data relating to a game player, and/or a request to display data relating to the video game.

The user interface may include a game view and/or a drawing overlay command. The drawing overlay command may provide a manually input line and/or a preprogrammed line superimposed over the game view.

The secondary display controller may provide a secondary view of the gaming environment to the broadcaster. The secondary view may include a rewound view of the video game, a slow-motion view of the video game, an alternative perspective of the video game from a primary perspective displayed on the primary display, an alternative zoom quantity of the video game from a primary zoom quantity displayed on the primary display, and/or a view of the video game including a drawing overlay.

The display controller may include a tertiary display controller for displaying an additional video signal for an additional peripheral display.

In the method recorded on a non-transitory computer readable storage medium, a configurable user interface to the broadcaster may be provided. The configurable user interface may include a touch screen interface, a rewind command, a command to highlight an avatar of a game participant, a request to display data relating to a game player, a request to display data relating to the video game, and/or a game view and a drawing overlay command.

The method recorded on a computer medium may provide a secondary view of the gaming environment to the broadcaster including a rewound view of the video game, a slow-motion view of the video game, an alternative perspective of the video game from a primary perspective displayed on the primary display, an alternative zoom quantity of the video game from a primary zoom quantity displayed on the primary display, and/or a view of the video game including a drawing overlay.

Figure 5:
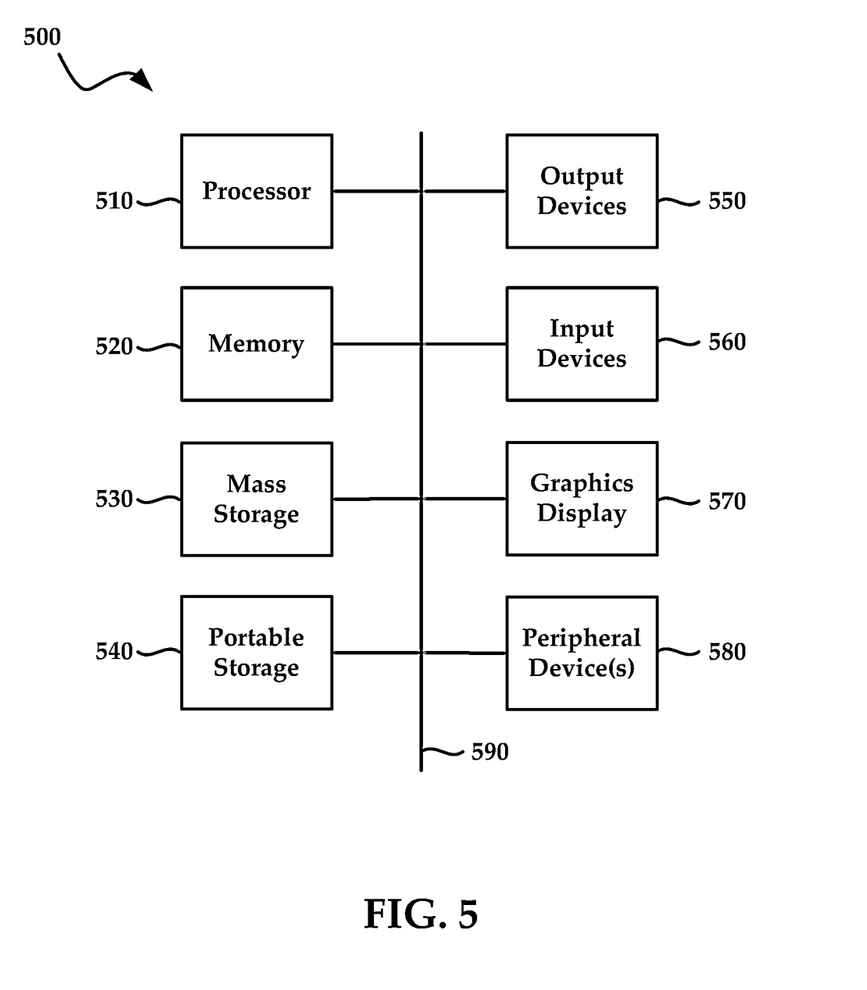
FIG. 5 is a block diagram of an exemplary computing system that may be utilized to practice aspects of the present disclosure.

FIG. 5 illustrates an exemplary computing system 500 that may be used to implement an embodiment of the present technology. Either of the end user computing system 115 and/or the server 110 may include one or more of the components of computing system 500. The computing system 500 of FIG. 5 includes one or more processors 510 and memory 520. Memory 520 stores, in part, instructions and data for execution by the one or more processors 510. Memory 520 can store the executable code when the system 500 is in operation. The system 500 of FIG. 5 may further include a mass storage device 530, portable storage medium drive(s) 540, output devices 550, user input devices 560, a graphics display 570, and other peripheral device(s) 580.

The components shown in FIG. 5 are depicted as being connected via a single bus 590. The components may be connected through one or more data transport means. The one or more processor 510 and memory 520 may be connected via a local microprocessor bus, and the mass storage device 530, peripheral device(s) 580, portable storage medium drive(s) 540, and graphics display 570 may be connected via one or more input/output (I/O) buses.

Mass storage device 530, which may be implemented with a magnetic disk drive or an optical disk drive, is a non-volatile storage device for storing data and instructions for use by processor 510. Mass storage device 530 can store the system software for implementing embodiments of the present technology for purposes of loading that software into memory 520.

Portable storage medium drive(s) 540 operate in conjunction with a portable non-volatile storage medium, such as a floppy disk, compact disk or digital video disc, to input and output data and code to and from the computing system 500 of FIG. 5. The system software for implementing embodiments of the present technology may be stored on such a portable medium and input to the computing system 500 via the portable storage medium drive(s) 540.

Input devices 560 provide a portion of a user interface. Input devices 560 may include an alphanumeric keypad, such as a keyboard, for inputting alphanumeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral device(s) 580 may include any type of computer support device to add additional functionality to the computing system. Peripheral device(s) 580 may include a modem or a router.

The components contained in the computing system 500 of FIG. 5 are those typically found in computing systems that may be suitable for use with embodiments of the present technology and are intended to represent a broad category of such computer components that are well known in the art. Thus, the computing system 500 of FIG. 5 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for operating a broadcaster mode within a gaming environment of a video game, the method comprising:
   providing a primary view of the gaming environment to a broadcaster for viewing on a primary display of the broadcaster using a primary display module, the broadcaster being a non-participating actor in the video game occurring within the gaming environment;
   receiving, via a networked gaming system, a request from the broadcaster for a video signal of a secondary view of the gaming environment for viewing on a peripheral display of the broadcaster;
   providing the video signal to the broadcaster for viewing on the peripheral display of the broadcaster using a secondary display module;
   receiving a command, via a command sub-module, from the broadcaster to manipulate the secondary view on the peripheral display, and changing the secondary view in response to the received command;
   receiving a command, via the command sub-module, to move the manipulated secondary view to the primary display;
   moving the secondary view to the primary display to become the primary view; and
   broadcasting the view on the primary display of the broadcaster to at least one spectator using a broadcaster module.

2. The method according to claim 1, wherein the peripheral display comprises at least one of a smartphone and a touch screen tablet computer.

3. The method according to claim 1, wherein the request comprises a request for a user interface.

4. The method according to claim 3, wherein the user interface comprises at least one touch screen control.

5. The method according to claim 3, wherein the user interface is configurable by the broadcaster.

6. The method according to claim 3, wherein the user interface comprises at least one of a rewind command, a command to highlight an avatar of a game participant, a request to display data relating to a game player, and a request to display data relating to the video game.

7. The method according to claim 3, wherein the user interface comprises at least a game view and a drawing overlay command, the drawing overlay command for providing one of a manually input line and a preprogrammed line superimposed over the game view.

8. The method according to claim 1, wherein the requested video signal comprises a request for a secondary view of the gaming environment, the primary view of the gaming environment being displayed on the primary display of the broadcaster.

9. The method according to claim 8, wherein the secondary view comprises a rewound view of the video game, a slow-motion view of the video game, an alternative perspective of the video game from a primary perspective displayed on the primary display, an alternative zoom quantity of the video game from a primary zoom quantity displayed on the primary display, and a view of the video game including a drawing overlay.

10. The method according to claim 1, further comprising:
   receiving a command from the broadcaster to move the video signal displayed on the peripheral display of the broadcaster to the primary display, the command received via a command sub-module; and
   moving the video signal to the primary display of the broadcaster before the view on the primary display is broadcast to the at least one spectator.

11. The method according to claim 1, further comprising:
   receiving, via the networked gaming system, an additional request from the broadcaster for an additional video signal for an additional peripheral display of the broadcaster; and
   providing the additional video signal to the broadcaster for viewing on the additional peripheral display.

12. A non-transitory computer readable storage medium having embodied thereon a program, the program executable by a processor to perform a method providing a peripheral device control to a broadcaster mode within a gaming environment, the method comprising:
   receiving, via a networked gaming system, a request from a broadcaster for a video signal for a peripheral display, the broadcaster being a non-participant in a video game occurring within the gaming environment;
   providing the requested video signal to the broadcaster for viewing on the peripheral display of the broadcaster using a secondary display module;
   receiving a single button command, via a command sub-module from the broadcaster to rewind the secondary view on the peripheral display a preset period of time;
   rewinding the secondary view the preset period of time in response to the received single button command;
   receiving a command, via the command sub-module, to move a video signal of the rewound secondary view to a primary display to become a primary view a to available to a plurality of spectators in a spectator mode;
   moving the video signal of the rewound secondary view to the primary display; and
   providing the video signal of the rewound secondary view on the primary display to the plurality of spectators for viewing in the spectator mode.

13. The non-transitory computer readable storage medium of claim 12, wherein the method further comprises providing a configurable user interface to the broadcaster, the configurable user interface comprising at least one of a touch screen interface, a rewind command, a command to highlight an avatar of a game participant, a request to display data relating to a game player, a request to display data relating to the video game, and a game view and a drawing overlay command.

14. The non-transitory computer readable storage medium of claim 12, wherein the method further comprises providing a secondary view of the gaming environment to the broadcaster, the secondary view comprising a rewound view of the video game, a slow-motion view of the video game, an alternative perspective of the video game from a primary perspective displayed on the primary display, an alternative zoom quantity of the video game from a primary zoom quantity displayed on the primary display, and a view of the video game including a drawing overlay.

15. A non-transitory computer readable storage medium having embodied thereon a program, the program executable by a processor to perform a method comprising:
  providing control of a peripheral display of the broadcaster to a broadcaster mode within a gaming environment;
  providing a master view of the gaming environment to a broadcaster for viewing in broadcaster mode on a primary display of the broadcaster, the broadcaster being a non-participating actor in the video game occurring within the gaming environment;
  providing to the broadcaster access in the broadcaster mode to a secondary view of the gaming environment for viewing on the peripheral display of the broadcaster;
  receiving a command from the broadcaster to manipulate the secondary view on the secondary display;
  changing the secondary view in response to the received command before moving the secondary to the primary display;
  receiving a command from the broadcaster to move the manipulated secondary view on the peripheral display to the primary display;
  moving the secondary view to the primary display; and
  broadcasting the secondary view on the primary display of the broadcaster to a plurality of spectators for viewing in spectator mode.

16. The non-transitory computer readable storage medium of claim 15, wherein the secondary view of the gaming environment provided to the broadcaster comprises at least one of a rewound view of the video game, a slow-motion view of the video game, an alternative perspective of the video game from a primary perspective displayed on the primary display, an alternative zoom quantity of the video game from a primary zoom quantity displayed on the primary display, and a view of the video game including a drawing overlay.

17. The non-transitory computer readable storage medium of claim 15, further comprising:
  manipulating the master view based on the secondary view; and
  broadcasting the master view after the manipulation of the master view.

18. The non-transitory computer readable storage medium of claim 15, further comprising providing to the broadcaster access in the broadcaster mode to information not available in the spectator mode.

* * * * *